March 22, 1938.  G. C. ARMSTRONG  2,111,540

VOLTAGE REGULATOR

Filed Sept. 5, 1935

WITNESSES:

INVENTOR
George C. Armstrong.
BY
ATTORNEY

Patented Mar. 22, 1938

2,111,540

UNITED STATES PATENT OFFICE 2,111,540

VOLTAGE REGULATOR

George C. Armstrong, Forest Hills, Pa., assignor to Westinghouse Electric & Manufacturing Company, East Pittsburgh, Pa., a corporation of Pennsylvania Application September 5, 1935, Serial No. 39,255

3 Claims. (Cl. 175—335)

This invention relates to voltage regulators.

It is an object of this invention to provide a voltage regulator of more dead-beat action than has heretofore been obtained.

It is a further object of this invention to produce a voltage regulator thoroughly reliable and of less cost than those heretofore known.

Other objects of the invention will be apparent from the following description and the accompanying drawing, in which.

Figure 1:
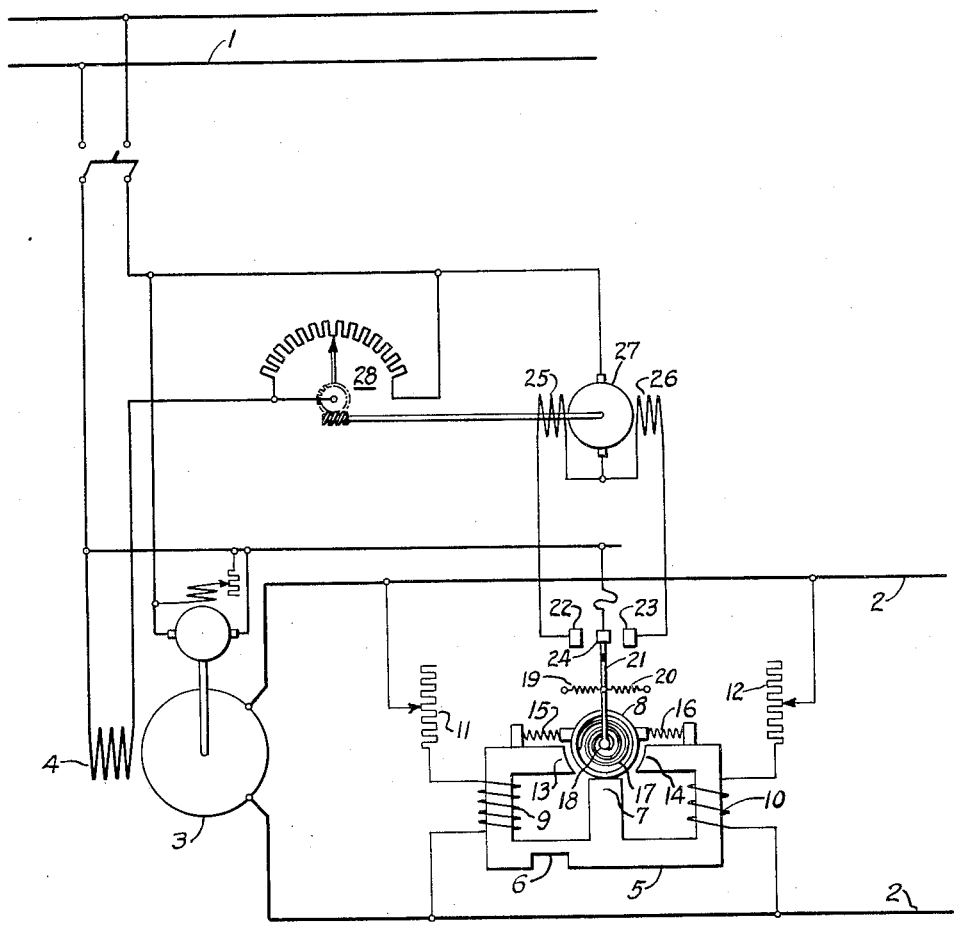
Figure 1 is a diagram illustrating the voltage regulator and its circuit.

In Fig. 1, the line 1 supplies direct-current power which is intended to produce a uniform alternating-current voltage on the line 2—2. The voltage is supplied by means of an alternating-current generator 3 having a field 4 and driven by a motor fed from the line 1. Connected across the line 2 is the voltage regulator which comprises a magnetic circuit 5 having two branches. One branch has less iron than the other. This is represented in the drawing by a notch 6, although in actual construction, a smaller body of iron in this branch than in the other branch could be used.

The middle member 7 of the magnetic circuit affords a pole face on which a rotor 8 moves. On the branch having the smaller amount of iron is a coil 9. The number of turns in this coil is preferably larger than that of the coil 10 on the other branch. Instead of the larger number of turns, I may obtain the same effect by altering the length of the branch or of the air gap therein.

In series with the coil 9 is an adjustable resistor 11 and an adjustable resistor 12 may be in series with the coil 10. The connections through the coils and resistors in each case are across the line 2.

The rotor 8 is mounted on the pole face 7 to oscillate under the influence of the alternating flux of the pole faces 13 and 14 in the two branches, respectively. The windings of the coils 9 and 10 are in such senses that the polarities of poles 13 and 14 at any one moment are alike. Springs 15 and 16 act on the rotor 8 through pressure blocks. A spiral spring 17 connects the rotor 8 with a shaft 18 which may be mounted in any suitable bearings. Springs 19 and 20 serve to center the arm 21 which is connected to the shaft 18. Contacts 22 and 23 cooperate with contacts 24 upon said arm.

Contact 24 is connected to one side of the line 1; contacts 22 and 23 are connected, respectively, to fields 25 and 26 of a motor 27. The armature of this motor is connected between that side of the line 1 which is not connected to the contact 24 and the common terminal of the two fields 25 and 26. The motor 27 drives an adjustable rheostat 28 which is connected in series between the field 4 and the line 1.

In operation of the device, at low voltage, the coil 10 will produce less flux in the branch having the pole face 14 than the coil 9 will produce in the branch having the pole piece 13. At higher voltage, the effect of the notch 6 becomes noticeable and the coil 9 produces less flux through the pole 13 than the coil 10 produces through the pole 14.

Figure 2:
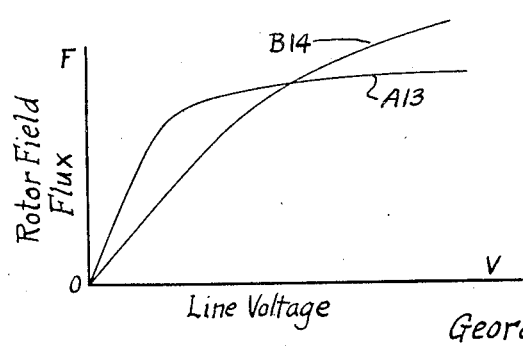
Fig. 2 is a set of curves used in the explanation of the invention.

This is illustrated in Fig. 2 where the curve A13 shows the flux in pole 13 and the curve B14 that in pole 14 for given voltage across the line 2. These curves cross one another because for the magnetic circuit with the smaller amount of iron, the increase in flux with increasing voltage is more rapid at low voltage than it is at higher. For the magnetic circuit with the more iron and the fewer turns in the coil, the increase in flux with increasing voltage is less rapid at low voltage and more rapid at high voltage than with the other magnetic circuit. This means that the curve A13 will be steeper at first than curve B14 but more nearly horizontal at high voltage than curve B14. The two curves must, therefore, cross. The resistor 11 is adjusted so that the fluxes through the two pole faces are equal at the voltage on the line 2 which is desired. The resistor 12, if one is used, is so adjusted that the adjustment just described can be accomplished with a convenient setting of the resistor 11.

When the flux in the two branches is equal the device is without effect upon the rotor 8. When the flux through the branch 14 is greater than the flux through the branch 13, the rotor 8 is subjected to the flux entering from the pole face 7 and to the difference between the flux from pole 13 and that from pole 14. It is also subjected to the biasing effect of one of the springs 15 and 16 and its action is further effected by its own hysteresis. The combined effect of these three influences has been discussed in detail in my copending application Serial No. 46,287, filed October 23, 1935.

When the attraction of pole 14 exceeds that of pole 13, the motion of the rotor 8 will result in a cumulative effect of a rotation clockwise as seen in Fig. 1. The step-by-step character of this rotation is largely absorbed by the action of the spring 17, the individual steps of the rotation being too rapid to show in the movement of the cylinder 8. The moment of inertia of the arm 21 is great enough to further absorb what remains of the non-uniform characteristic of the rotation and the result is that the arm moves toward the right with a practically steady torque. This brings the contact 24 against the contact 23 and holds it there. After the motion of the arm 21 is stopped by the contacts being in engagement, further motion of the rotor 8 is absorbed in tightening the spring 17 until this spring exerts enough biasing effect to prevent further rotation of the cylinder.

When the tractive effect of the pole 13 exceeds that of the pole 14, a similar action takes place in the opposite direction. The spring 15 then takes the place of the spring 16 and the spring 19 that of the spring 20. The contact 24 in this case meets the contact 22.

When the voltage on the line 2 is low, current in coil 9 produces more flux in pole 13 than current in coil 10 produces in pole 14. It results, therefore, that contacts 22 and 24 close with the result that the field 25 and the armature 27 are connected as a series motor and the rheostat 28 moves to adjust the field 4 so that the voltage will be corrected.

On the other hand, when the voltage on the line 2 is high, the rotor 8 will move clockwise as seen in Fig. 1, and contacts 24 and 23 will close, with the result that the field 26 now cooperates with the armature 27 and the rheostat 28 is moved in the opposite direction adjusting the field 4 in the opposite way, to again correct the voltage on the line 2.

Many modifications of the details of this invention will be apparent to those skilled in the art and I do not wish to be limited by the specific illustration of one circuit.

I claim as my invention:

1. A magnetic structure having a central portion and two side portions of different reluctance, a coil on each of the two side portions, an adjustable resistor in series with one coil, a pole on the central portion and a pole on each side portion, the three poles being adjacent each other, a hollow cylinder of magnetic material in the space separating said poles said cylinder resting on the pole of the central portion, and spring-pressed blocks acting on said cylinder from each side, whereby the cylinder will rotate, under the influence of said pressure, the friction with the pole face and the difference between the flux in the two side portions, in one sense or the other according as the flux in one side portion or the other is greater.

2. In a voltage regulator, a magnetic structure having two portions of different reluctance provided with pole faces and a member common to both of said portions, coil means for energizing said portions, a cylinder of magnetic material in the space between said pole faces and contacting said common member, spring-pressed blocks acting on said cylinder from each side, whereby the cylinder will rotate under the influence of said pressure and the difference between the flux in said two portions, in one direction or the other according as the flux in one portion or the other is greater, and contact-making means controlled by said rotation.

3. In a voltage responsive device, a magnetic circuit having two branches severally comprising portions extending in substantial alinement and a member common to both of said branches and extending at substantially right angles to said portions, coil means for separately energizing each of said branches, one of said coil means having more turns than the other, and a member rotatable in response to the relative fluxes from both of said coils around an axis at substantially right angles to the flux emanating from each of said portions and from said common member, one of said branches having less iron than the other and having wound thereon said coil having more turns, whereby the effect of one branch on said rotatable member increases with increasing voltage faster at low voltage and slower at high voltage than the effect of the other.

GEORGE C. ARMSTRONG.